W. TURNBULL.
TRACTION ENGINE CONTROL.
APPLICATION FILED AUG. 12, 1918.
1,381,769.
Patented June 14, 1921.
2 SHEETS—SHEET 2.
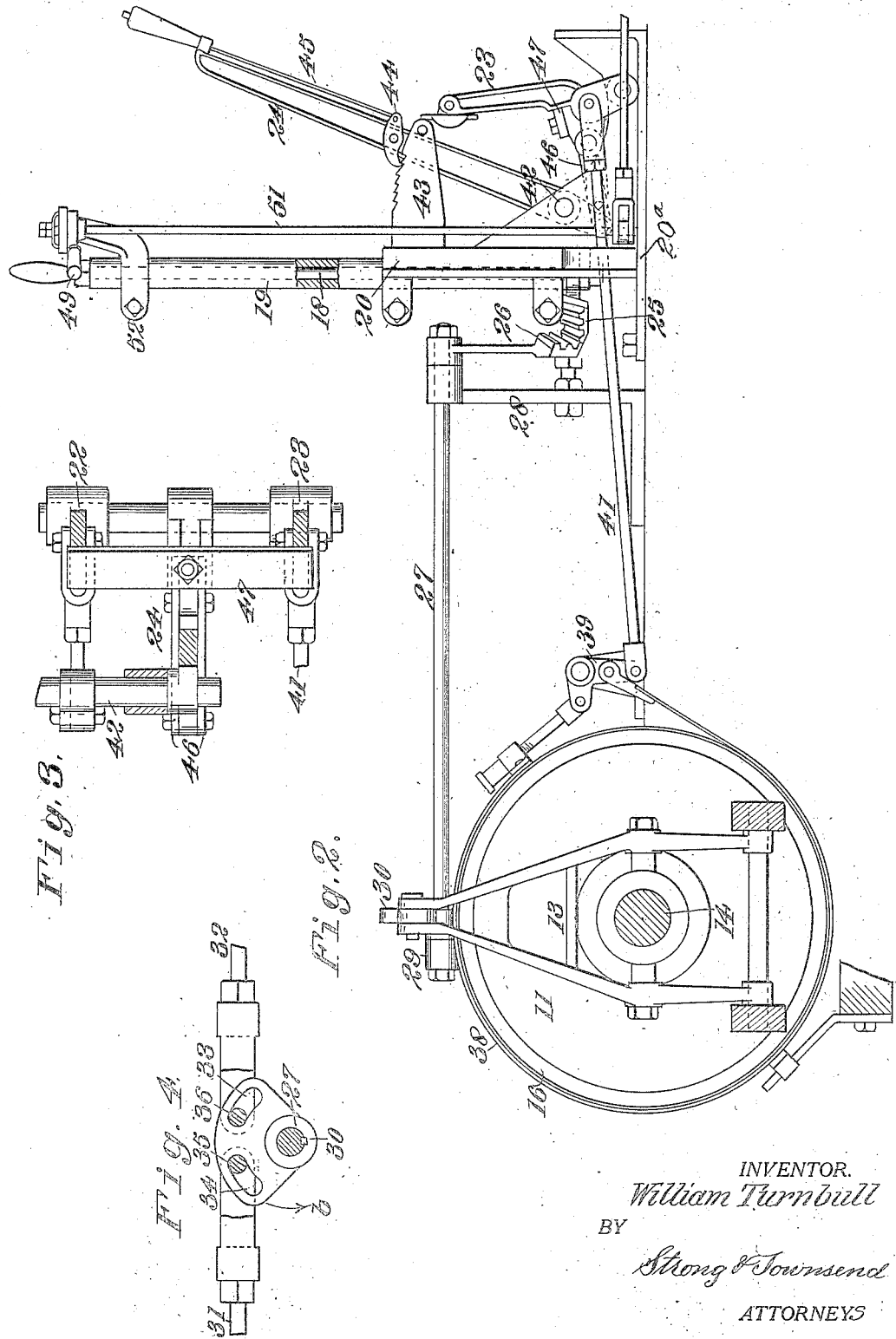
INVENTOR.
William Turnbull
BY
Strong & Townsend
ATTORNEYS

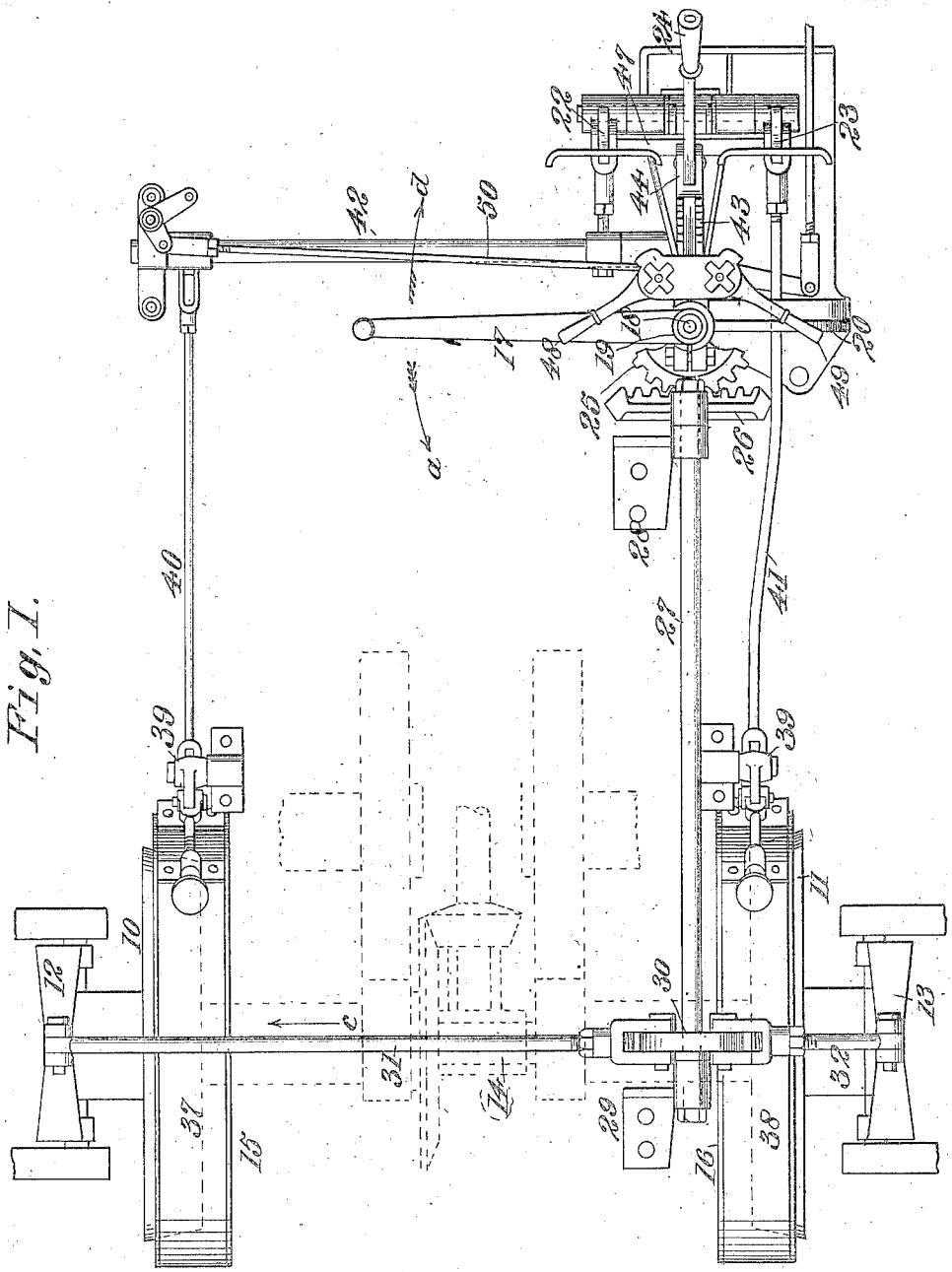

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

TRACTION-ENGINE CONTROL.

1,381,769.     Specification of Letters Patent.     Patented June 14, 1921.

Application filed August 12, 1918. Serial No. 249,482.

*To all whom it may concern:*

Be it known that I, WILLIAM TURNBULL, a citizen of the United States, residing at Peoria, in the county of Peoria and State of Illinois, have invented a new and useful Improvement in Traction-Engine Controls, of which the following is a specification.

This invention relates to a traction engine control, particularly adapted for use in connection with the transmission as disclosed in my copending application, 77,382, filed February 10, 1916.

It is the principal object of this invention to provide simple operating means for easily controlling the relative operating speeds of complementary propelling members such as the two drive wheels of a motor vehicle or the truck units of self-laying track tractors, and thereby to effect a steering of the vehicle.

The present invention contemplates the use of a single driving axle adapted to transmit power to traction units adjacent to the opposite ends thereof through separate steering clutches, said clutches being susceptible of control from a single steering lever, and furthermore adapted to be separately or simultaneously held against rotation by other simply operated controlling elements.

One form of the invention is embodied in a structure as disclosed in the accompanying drawings in which—

Figure 1 is a fragmentary view in plan particularly illustrating the elements of the present invention as disassociated from the remaining parts of a tractor.

Fig. 2 is a view in side elevation with parts broken away disclosing the controlling levers and the steering clutch construction.

Fig. 3 is an enlarged fragmentary view illustrating the manner in which the clutch brakes may be separately or simultaneously actuated.

Fig. 4 is an enlarged fragmentary view illustrating the means by which the steering clutches may be alternately operated by a single member.

In the drawings, 10 and 11 indicate clutch cones adapted to be separately manipulated by shift yokes 12 and 13, respectively. The clutch cones are fixed to rotate with the opposite ends of a drive shaft 14, which extends through a transmission mechanism case and is driven by a suitable driving gear set. Freely rotatable upon the shaft and near the clutch cones are clutch drums 15 and 16. These drums are normally provided with sleeves through which power is transmitted to the separate traction units of the vehicle. It will thus then be evident that frictional engagement between the separate clutch cones and the drums will cause motion to be imparted from the shaft 14 through the drum to the complementary traction unit.

Separate manipulation of the clutch cones to produce this individual driving is effected by a control lever 17 fixed at the upper end of a vertical steering shaft 18 mounted in convenient relation to the driver. The shaft 18 is carried within a tubular steering column 19 rigidly held by a standard 20. This standard is particularly shown in Fig. 2, where it will be seen to constitute a portion of a casting 20$^a$ upon which a pair of pedals 22 and 23 are pivotally mounted as well as a hand lever 24. The lower end of the steering shaft 19 is provided with a segmental gear 25. This gear is in mesh with a complementary gear segment 26, which is carried by a horizontal rock shaft 27. The rock shaft is rotatably held at its forward end by an angle bracket 28. The rear end of this shaft is carried by a similar bracket 29 secured at a suitable point upon the vehicle. This rock shaft is fitted with a slotted bell crank 30 adapted to alternately operate connecting rods 31 and 32. These rods extend in diametrically opposite directions from the bell crank, and at right angles to the rock shaft to be pivotally connected at their outer ends to the shifting yokes 12 and 13. In order that the connecting rods may be separately operated by the bell crank a pair of arcuate slots 33 and 34 are formed in the bell crank and separately receive yoke pins 35 and 36 by which the adjacent ends of the connecting rods are fastened to the crank. The normal position of the pins within the slots is such that a rocking motion in either direction will affect the connecting rod on that side to move it outwardly and disengage the clutch at the same time allowing the connecting rod upon the opposite side to remain idle.

The clutch drums 15 and 16 are adapted to be held separately against rotation by means of brake bands 37 and 38, respectively. These bands are provided with suitable operating levers 39 by which they may be contracted when actuated by one of the draw rods 40 or 41. The draw rod 40 is provided to operate the band 37, while the draw rod 41 is provided to operate the band 38. In the present instance the draw rod 41 is directly connected to the shank of the pedal 23, while the draw rod 40 is connected to a lever upon the transverse shaft 42, which, in turn, is operably connected to the pedal 22. By means of this arrangement the pedals may be separately operated to retard the rotation of the clutch drums 15 and 16.

In case the two drums are to be used for braking purposes it is essential that the brake bands 37 and 38 be simultaneously contracted. This is directly effected by the hand lever 24, which is pivoted at its lower end within the casting 20ª. The standard also carries a ratchet segment 43 adapted to be engaged by a pivoted pawl 44 mounted upon the hand lever 24. By this means the brake may be adjustably set and may be released by the push rod 45. The lower end of the hand lever 24 is provided with a pair of shackle plates 46 which connect to a transverse lever bar 47. This bar extends laterally and rests against the rear side of each of the pedals 22 and 23. By this means, therefore, a forward movement of the hand lever will cause simultaneous engagement with the pedals and force them forwardly to actuate the brake mechanisms in unison.

In the drawings a pair of small hand levers 48 and 49 are shown, which, in turn, connect with rods 50 and 51. These rods and levers constitute the spark and fuel control for the engine of the tractor, and are carried upon a suitable bracket 52 clamped around the steering column 19.

In operation the vehicle may be guided by the movement of the control lever 17. When this lever is drawn rearwardly in the direction of arrow $a$ the gear segments 25 and 26 will be operated to rotate the rock shaft in the direction of arrow $b$ as shown in Fig. 4. This will cause the end of slot 33 to engage the pin 35 and force the connecting rod 31 outwardly in the direction of the arrow $c$ as seen in Fig. 1. The cone 10 will thus be released from engagement with the drum 15, and will, therefore, disengage the driving shaft 14 from the drum and thus discontinue rotation of the track or other traction means directly effected thereby. As the opposite clutch members are engaged the vehicle will be turned toward the side of the disengaged clutch. In case the control lever 17 is moved in the direction of the arrow $d$ in Fig. 1, a reverse effect will be produced, and the vehicle will be caused to turn in the opposite direction. A variation in the speeds at which the two traction members along the opposite sides of the vehicle may be driven is produced by separate manipulation of the pedals 22 and 23. In case a slight deviation is to be made in the path of travel of the vehicle the control lever is moved to cause a partial disengagement of the appropriate clutch mechanism. A sharp turn is effected by completely disengaging the proper clutch and at the same time applying the corresponding brake. The clutch mechanisms are normally held in engagement by spring means not shown.

It will thus be seen that the steering mechanism here disclosed, while decidedly simple in its construction and possessed of few operating parts, will act directly to affect the path of travel of a vehicle, and to turn it under its own power in any direction.

The present steering mechanism allows the driver's seat to be positioned forwardly of the steering clutches which latter are normally at the rear of the vehicle frame, and this forward position of the driver's seat has the effect of reducing the overall length of the machine, and in addition, places him in closer proximity with the motor and other operating parts of the tractor. The simultaneous control of the brakes, in addition to the separate and independent controls therefor, adapts the tractor for military and other uses where steep hills or deep excavations are encountered and it becomes desirable to brake the tractor.

Having thus described my invention, what I claim and desire to secure by Letters Patent is:

1. In a vehicle, the combination with a pair of steering clutches at each side thereof, an inwardly extending shift-rod for each clutch, of a steering post located forwardly of the clutches, and a longitudinally extending rock shaft operatively connected with the steering post and having one way connections with the shift-rods.

2. In a vehicle, a steering clutch at each side thereof, inwardly extending shift-rods for the controlling of said clutches, a horizontally extending rock shaft, a vertical steering post, segmental gearing operatively connecting the rock shaft to the post, and a member on said rock shaft operatively connected to the shift-rods for actuating the latter independently.

In testimony whereof I have hereunto set my hand in the presence of two subscribing witnesses.

WILLIAM TURNBULL.

Witnesses:
S. L. MATHIS,
H. B. BAKER.